Aug. 29, 1961      F. L. BENTON      2,998,437
NITRATION OF CARBOXYLIC ACIDS AND THEIR DERIVATIVES
Filed Aug. 21, 1959
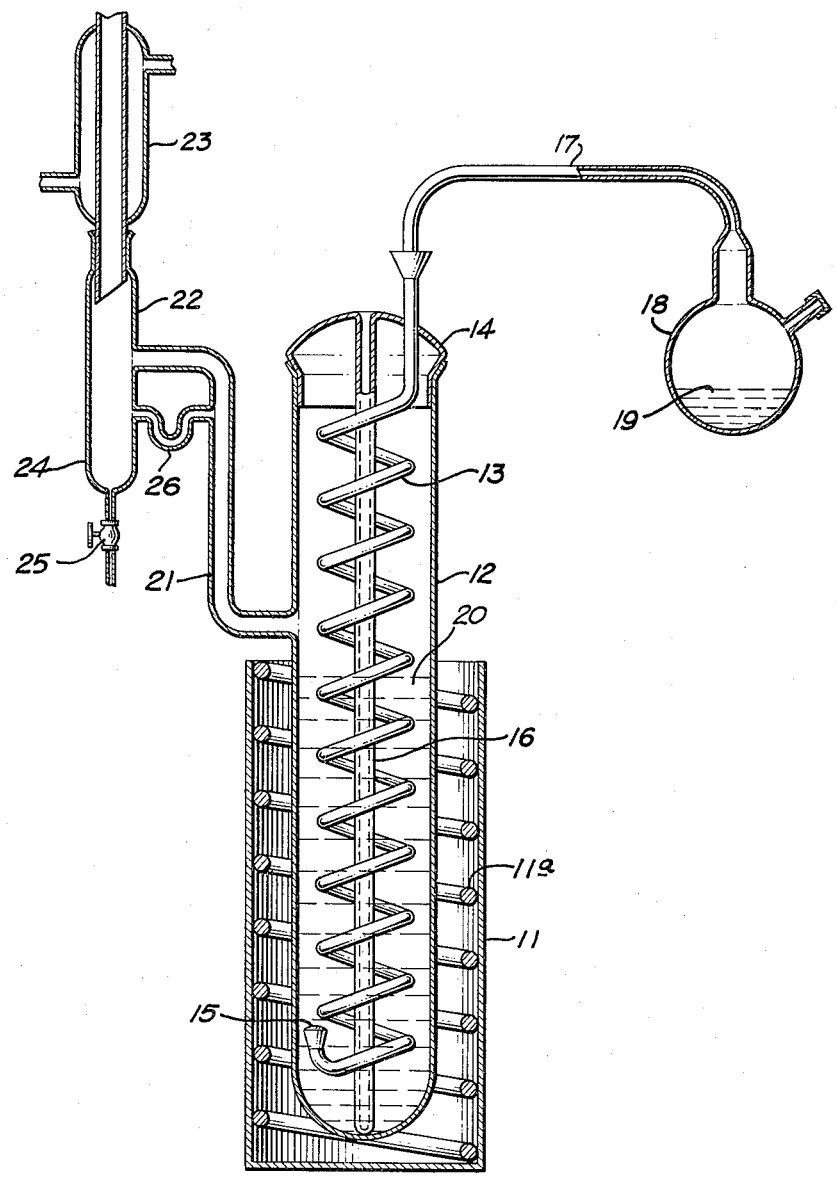
INVENTOR
Francis L. Benton
Carl C. Batz
ATTORNEY

12

2,998,437
NITRATION OF CARBOXYLIC ACIDS AND THEIR DERIVATIVES

Francis L. Benton, Lombard, Ill., assignor to Armour and Company, Chicago, Ill., a corporation of Illinois
Filed Aug. 21, 1959, Ser. No. 835,369
17 Claims. (Cl. 260—404)

This is a continuation-in-part of my copending United States patent application Serial No. 702,635, filed December 13, 1957, and now abandoned.

This invention relates to the nitration of organic compounds. More particularly, this invention relates to the nitration of saturated carboxylic acids and derivatives thereof, including esters, nitriles and substituted acids and esters, with tetravalent nitrogen oxides, and to the products obtained thereby.

The nitration of aliphatic and aromatic hydrocarbons has been extensively studied and a variety of procedures have been developed for producing nitroparaffins and nitroarenes (nitrated aromatic hydrocarbons) in high yield and in a state of high purity. However, fatty acids and their derivatives differ significantly from the hydrocarbons, and the nitration of such substances has never been heretofore successfully accomplished. The fatty acids and derivatives are relatively non-volatile and the nitration of such materials is a more difficult and more complicated matter than the nitration of simple hydrocarbons. Consequently, new procedures have to be developed for the nitration of fatty acids and their derivatives in satisfactory yields.

It is an object of this invention to develop a useful procedure for the production of nitrated carboxylic acids and derivatives thereof. It is another object of this invention to provide a method of nitrating fatty acids and derivatives of fatty acids with readily available starting materials. A further object is to provide a method of producing nitro fatty acids, nitriles and esters with little or no oxidation or other degradation of the organic compounds. It is an additional object of this invention to develop a method of nitrating fatty acids and derivatives of fatty acids in simple readily available equipment at conditions which are easily established in ordinary chemical practice. It is yet another object of this invention to provide a method for producing nitrated fatty acids and derivatives of fatty acids in high yield in a state of purity. A further object of this invention is to provide a method for purifying nitrated fatty acids and derivatives whereby unnitrated and polynitrated materials may be separated therefrom to provide relatively pure nitrated products. These and other objects of this invention are apparent from and are achieved in accordance with the following disclosure and the attached drawing which forms a part hereof.

In the attached single-sheet drawing a furnace 11 or other appropriate heating device containing a heating element 11a surrounds a reaction tube or vessel 12 which contains the fatty acid ester or nitrile 20 to be nitrated. A preheater tube 13, preferably of spiral form, is positioned within the reaction tube 12 and extends from the top cover 14 thereof to close to the bottom thereof where a coarse fritted dispersion tube 15 is attached thereto. Also attached to the top 14 is a cylindrical well 16 which is positioned substantially concentrically of the reaction tube and extends near the bottom thereof. The well 16 is provided for the purpose of temperature measurement of the reaction mixture by means of thermometer or thermocouple (not shown). The preheater tube 13 is attached by an appropriate tube 17 to a vessel 18 which contains oxides of nitrogen 19. The vessel 18 is heated by a suitable heater (not shown) and the oxides of nitrogen 19 are evaporated through the tube 17 into the preheater tube 13 through which they descend to the bottom of the reaction vessel 12 and escape through the fritted dispersion tube 15 upward through the molten fatty acid or derivative 20 thereof contained in the reaction vessel 12.

By means of the spiral preheater tube 13, the oxides of nitrogen are brought to approximately the temperature of the molten fatty acid or derivative 20 prior to escape through the dispersion tube 15, whereby insuring that the reaction will be carried out at the appropriate temperature provided by the furnace 11. During the reaction of the oxides of nitrogen with the carboxylic acid, ester or nitrile 20, there is produced a certain quantity of water which, at the temperature of the reaction mixture, is boiled out of the fatty acid or derivative. Water vapor, oxides of nitrogen and small quantities of organic material pass through a side arm 21 into a separator 22 and thence into the condenser 23. Water is condensed in the condenser 23 and falls back into the bottom part 24 of the separator 22 where it collects. The water may be drawn off through the valve 25. When essentially the theoretical amount of water has been collected in the separator 22, the reaction is substantially complete. Any organic material which is condensed collects on top of the water in the bottom part 24 of the separator 22 and returns to the reaction tube 12 via a trap 26 and the side arm 21. Oxides of nitrogen escape through the side arm 21, the separator 22 and the condenser 23.

Generally, the present invention comprises the liquid phase nitration of saturated compounds such as a carboxylic acid, ester or nitrile or substituted carboxylic acid, ester or nitrile with a tetravalent oxide of nitrogen at temperatures in the range of about 145 to 205° C. Generally less than the theoretical amount of oxide of nitrogen is used for the production of mononitro products, usually about 20 to 25% of the theoretical. The mononitro acid derivative is separated from the starting material and the latter may be recycled to increase the relative amount of conversion to mononitro derivative. If polynitro products are desired, an increased amount of tetravalent oxide of nitrogen is used.

During the reaction, water is formed for each two moles of carboxylic acid or equivalent in the reaction mixture and the amount of water collected in the separator is a measure of the amount of nitration. When the requisite amount of tetravalent oxide of nitrogen has been passed into the molten carboxylic acid or derivative and the evolution of water from the reaction mixture has ceased, which generally takes from two to five hours, then the reaction is considered complete and the product, which consists of mononitrated and polynitrated compounds, as well as some unreacted carboxylic acid or saturated carboxylic acid derivative, is separated so that the unnitrated material may be removed and the nitrated product isolated.

Generally speaking, the compounds which can be nitrated by my liquid phase process include those saturated carboxylic acids and nitriles containing from about 6 to about 22 carbon atoms in the alkyl portion of the molecule and saturated esters containing from about 6 to about 18 carbon atoms in the acid portion of the molecule and from 1 to 18 carbon atoms in the alcohol portion of the molecule. No less than four carbon atoms can separate the cyano and carboxyl radicals of the above-described acids, nitriles and esters. It is preferred that the acids, nitriles, and acid portions of the esters contain from about 12 to about 18 carbon atoms. Among these compounds are included mono and polycarboxylic acids such as caproic, lauric, stearic, behenic, adipic, azelaic, brassylic and 2-cyclohexylacetic, $\alpha,\alpha'$-diethylpimelic, $\beta,\beta$-dimethyl adipic, $\omega$-cyanoundecanoic acid; esters of mono and polycarboxylic acids such as methyl laurate, amyl palmitate, stearyl stearate, diethyl adipate, monobutyl suberate and cyclohexyl undecanate; and esters of the polyalcohols such as glyceryl dimethyl stearate, α-isopropyl adipate, tristearin and tripalmitin. The alcohol portion of the esters being nitrated can also be nitrated by increasing the molar ratio of nitrogen oxide to ester in the reaction system. The nitrile derivatives of the above described fatty acids, for example adiponitrile and stearonitrile, can also be nitrated by my process as well as substituted acids, esters and nitriles where the substituent is not attacked by the nitrogen oxide or can be blocked from attack by the usual means. For example, nitro substituted acids can be further nitrated by my process. Hydroxy acids wherein the hydroxyl group has been esterified can be utilized in my process and acids substituted by ether radicals, such as the ethoxy and amyloxy radicals may also be nitrated.

The use of tetravalent oxides of nitrogen as the nitrating agent at temperatures in the range of 145 to 205° C. avoids the degradation of organic molecules and the oxidation thereof. While 145 to 205° C. are temperatures at which my process is operable, I prefer to carry about my nitration at about 150 to 190° C. and I have found out that temperatures of about 175 to about 185 are optimum in most conditions. In this way there is little loss of acid or acid derivative as low molecular weight products, and all of the nitrated material has essentially the same carbon chain length as the starting product. Outside of water (steam) and oxides of nitrogen, there is little volatile material formed in the reaction. The products obtained from the nitration are both mono and polynitro acid esters and nitriles, depending upon the product being nitrated, there is no other oxidation, such as occurs with nitric acid nitration. In other words, there are no lower molecular weight products nor products containing hydroxyl or carbonyl substituents.

The nitrating agent used in this invention is an oxide of nitrogen wherein the nitrogen has a valence of 4. The nitrating agent may conveniently be nitrogen tetroxide, $N_2O_4$, which dissociates at elevated temperature to nitrogen dioxide, $NO_2$. Both of these tetravalent nitrogen oxides are useful as nitrating agents for fatty acids and derivatives thereof in my process.

The products of this invention are useful in the production of surface active agents and polymeric amides. The nitro group in the nitrated fatty acids or fatty acid derivatives can be reduced with Raney nickel or other catalyst, or with zinc and acetic acid or iron and hydrochloric acid to the corresponding primary amino compounds. In the case of the nitrated fatty acids, the reduction products are high molecular weight amino acids which can be used in producing surface active materials, such as detergents and wetting agents, or which can be condensed to form linear polyamides of the nylon type. Nitrated fatty acid nitriles can be reduced in the same manner to produce high molecular weight diamines which are useful in the production of surface active agents, particularly flotation agents, and in producing nylon type polymers on reaction with dibasic acids. The nitrated fatty acid esters can also be reduced as above to amino fatty acid esters. These substances can likewise be condensed to form polyamides of the nylon type. The nitrated fats, such as nitrated tristearin, can be hydrolyzed to nitrated fatty acids or can be reduced and then hydrolyzed to amino fatty acids which can be used as described above.

The nitration reaction is exothermic so that after the reaction has commenced, heat need not be supplied to the reaction mixture and the mixture can be maintained in the temperature range of 150–190° C. without the addition of heat controlling the rate of addition of nitrogen oxide. In some instances cooling may even be required to maintain the desired temperature range after the reaction has been initiated.

The organic compounds described as being useful in my process are not all liquids at reaction temperatures when in the pure form. These high melting acids, esters and nitriles can be nitrated by mixing them with other compounds to be nitrated to form low melting point eutectic mixtures. Alternately, these high melting solids can be ground and suspended in lower melting reactants and thus nitrated.

In the purification of the nitrated compounds formed in accordance with the invention, advantage is taken of the relative insolubility of the nitrated materials in petroleum ether. The unnitrated materials are more soluble in aliphatic hydrocarbons than the nitrated materials, and differential solubility procedures have been developed for separating unnitrated from nitrated materials. Likewise, the substances may be purified by chromatographic separation on silica or alumina by use of hydrocarbon solvents, such as petroleum ether, benzene and mixtures of benzene with ether.

For instance, methyl nitrolaurate can be separated from a methyl laurate nitration mixture by passing a solution of a mixture of the two compounds in an aliphatic hydrocarbon solvent, such as petroleum ether, over a column of silica. The first fractions contain methyl laurate. Then a solvent mixture of benzene and petroleum ether is passed over the silica column and it elutes the mononitro material, methyl nitrolaurate. Finally, a solvent mixture of alcohol and petroleum ether is passed over the column to remove the polynitrated ester, methyl polynitrolaurate. A similar procedure has been employed to separate unreacted lauronitrile from the nitrated lauronitrile except that alumina has been substituted for silicic acid as an absorbent.

The invention is disclosed in further detail by means of the following examples which are provided solely for the purpose of illustration and which are not intended to limit the invention. It will be appreciated by those skilled in the art that numerous modifications in temperatures, times, conditions, relative quantities of materials and equivalent substances can be made without departing from the invention. Quantities of materials are given in parts by weight and temperatures in degrees centigrade.

*Example I*

In an apparatus as shown in the drawing, 150 parts of lauric acid were placed in a reaction vessel 12 and heated to 160° C. 62 parts of nitrogen tetroxide were introduced into the flask 18 and warmed gently to a temperature above its boiling point (21.3°) to vaporize the nitrogen tetroxide. The gaseous tetravalent oxide of nitrogen passed down through the preheater tube 13 and disperser 15 and then up through the molten lauric acid 20. The reaction temperature of the mixture was maintained at 160–180° C. by adjusting the rate of introduction of tetravalent oxide of nitrogen and by adjusting the temperature of the surrounding furnace 11. After 1.5 hours, the addition of tetravalent oxide of nitrogen was complete and the reaction vessel was removed from the furnace and cooled. The water in the separator 24 was withdrawn through the valve 25 and discarded.

The nitrated product was removed from the reaction vessel 12 and was washed with concentrated sodium chloride solution and with water. The yield of product after drying was 169 parts. It was composed of some unnitrated lauric acid admixed with a major amount of mononitrolauric acid containing some di- and polynitrolauric acid. The infrared absorption spectrum of the nitrated product showed the presence of carboxyl and nitro groups but no nitrite or other functional groups. The nitrogen content (3.55%) of the product indicated that the product contained approximately 62% mononitrolauric acid of the formula

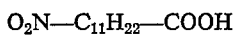

*Example II*

By the procedure of Example I, 150 parts of methyl laurate were nitrated at 160–180° C. by reaction with vapors of 60 parts of nitrogen tetroxide. After the reaction was complete the reaction mixture was poured over 1000 parts of crushed ice. The nitration product was washed with concentrated sodium chloride solution and with water and dried; the yield was 152 parts.

The infrared absorption spectrum of the nitrated product indicated the presence of the nitro group (band at 6.4 millimicrons) and the absence of the nitrite group. Analysis showed that the product contained about 4.1% nitrogen, equivalent to 76% methyl nitrolaurate of the formula

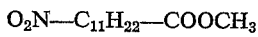
$O_2N-C_{11}H_{22}-COOCH_3$

*Example III*

Lauronitrile (146.5 parts) was heated to 170° C. in the apparatus shown in the drawing and treated with vapors of 60 parts of nitrogen tetroxide at 175–188° C. Addition of the nitrogen oxide required 2 hours (and was accompanied by considerable frothing), after which the reaction mixture was cooled to room temperature and washed with concentrated sodium chloride solution and with water. The yield of dried product was 160 parts.

Infrared spectra indicated the presence of the nitro group but not the nitrite radical. The product on analysis was found to contain 8.9% nitrogen, equivalent to about 72% nitrolauronitrile of the formula

$O_2N-C_{11}H_{22}-CN$

*Example IV*

150 parts of hydrogenated cottonseed oil (iodine value 1.0 and consisting principally of tristearin) were heated to 170° C. and treated at 170–187° C. with vapors from 60 parts of nitrogen tetroxide over a period of 2 hours, by the procedure of Example I. The reaction product was cooled, washed with sodium chloride solution and with water and dried. The yield was 264 parts.

Analysis of the nitrated product indicated 4.0% nitrogen, which is equivalent to about 98% trinitrotristearin of the formula

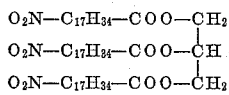
$$O_2N-C_{17}H_{34}-COO-CH_2$$
$$O_2N-C_{17}H_{34}-COO-CH$$
$$O_2N-C_{17}H_{34}-COO-CH_2$$

*Example V*

Following the procedure of Example I, adipic acid and adiponitrile are contacted with nitrogen dioxide to form α,α'-dinitro adipic acid and α,α'-dinitro adiponitrile.

Now having described my invention what I claim is:

1. A nitration process comprising contacting, with a tetravalent nitrogen oxide, a saturated material selected from the group consisting of an aliphatic monocarboxylic acid having from 6 to about 22 carbon atoms, an aliphatic monocarboxylic acid ester containing from 6 to about 22 carbon atoms in the acid portion of the molecule and from 1 to about 18 carbon atoms in the alcohol portion of the molecule, an aliphatic polycarboxylic acid having from about 6 to about 22 carbon atoms and having the carboxyl radicals in at least a 1,4 position relative to each other, an aliphatic monocyano nitrile having from 6 to about 22 carbon atoms, aliphatic polycyano nitriles having from 6 to about 22 carbon atoms and having the cyano radicals in at least a 1,4 position relative to each other, an ester of an aliphatic polycarboxylic acid containing from about 6 to about 22 carbon atoms in the acid portion of the molecule and from 1 to about 18 carbon atoms in the alcohol portion of the molecule and the carboxy radicals in the molecule having at least a 1,4 position relative to each other, an ester of an aliphatic cyanocarboxylic acid having from about 6 to about 22 carbon atoms in the carboxy substituted portion of the molecule and from 1 to 18 carbon atoms in the alcohol portion of the molecule and having at least a 1,4 position separation of substituent cyano and carboxyl radicals, and an aliphatic cyanocarboxylic acid having from about 6 to about 22 carbon atoms and having the cyano and carboxyl radicals in at least a 1,4 position relative to each other at temperatures of about 145–205° C.

2. A nitration process comprising contacting, with a tetravalent nitrogen oxide, a saturated material selected from the group consisting of an aliphatic monocarboxylic acid having from 6 to about 22 carbon atoms, an aliphatic monocyano nitrile having from 6 to about 22 carbon atoms, an aliphatic monocarboxylic acid ester containing from about 6 to about 22 carbon atoms in the acid portion of the molecule and from about 1 to about 18 carbon atoms in the alcohol portion of the molecule, an aliphatic polycarboxylic acid having from 6 to about 22 carbon atoms and having the carboxyl radicals in at least a 1,4 position relative to each other, an aliphatic monocyano nitrile having from 6 to about 22 carbon atoms, aliphatic polycyano nitriles having from 6 to about 22 carbon atoms and having the cyano radicals in at least a 1,4 position relative to each other, an aliphatic polycarboxylic acid ester containing from about 6 to about 22 carbon atoms in the acid portion of the molecule and from 1 to about 18 carbon atoms in the alcohol portion of the molecule and the carboxylic acid radicals and the acid portion of the molecule having at least a 1,4 position relative to each other, an ester of an aliphatic cyanocarboxylic acid having from about 6 to about 22 carbon atoms in the carboxy substituted portion of the molecule and from 1 to 18 carbon atoms in the alcohol portion of the molecule and having at least a 1,4 position separation of substituent cyano and carboxyl radicals, and an aliphatic cyanocarboxylic acid having from about 6 to about 22 carbon atoms and having the cyano and carboxyl radicals in at least a 1,4 position relative to each other at temperatures of about 150–190° C.

3. A nitration process comprising contacting, with a tetravalent nitrogen oxide, a saturated material selected from the group consisting of an aliphatic monocarboxylic acid having from 6 to about 22 carbon atoms, an aliphatic monocyano nitrile having from 6 to about 22 carbon atoms, an aliphatic monocarboxylic acid ester containing from about 6 to about 22 carbon atoms in the acid portion of the molecule and from 1 to about 18 carbon atoms in the alcohol portion of the molecule, an aliphatic polycarboxylic acid having from about 6 to about 22 carbon atoms and having the carboxyl radicals in at least an aliphatic 1,4 position relative to each other, a monocyano nitrile having from 6 to about 22 carbon atoms, aliphatic polycyano nitriles having from 6 to about 22 carbon atoms and having the cyano radicals in at least a 1,4 position relative to each other, an aliphatic polycarboxylic acid ester containing from about 6 to about 22 carbon atoms in the acid portion of the molecule and from 1 to about 18 carbon atoms in the alcohol portion of the molecule and the carboxylic acid radicals and the acid portion of the molecule having at least at 1,4 position relative to each other, an ester of an aliphatic cyanocarboxylic acid having from about 6 to about 22 carbon atoms in the carboxy substituted portion of the molecule and from 1 to 18 carbon atoms in the alcohol portion of the molecule and having at least a 1,4 position separation of substituent cyano and carboxyl radicals, and an aliphatic cyanocarboxylic acid having from 6 to about 22 carbon atoms and having the cyano and carboxyl radicals in at least a 1,4 position relative to each other at temperatures of about 175–185° C.

4. A nitration process comprising contacting, with a tetravalent nitrogen oxide, a saturated material selected from the group consisting of an aliphatic monocarboxylic acid having from 12 to about 18 carbon atoms, an aliphatic monocyano nitrile having from 12 to about 18 carbon atoms, an aliphatic monocarboxylic acid ester containing from 12 to about 18 carbon atoms in the acid portion of the molecule and from about 1 to about 18 carbon atoms in the alcohol portion of the molecule, an aliphatic polycarboxylic acid having from about 12 to about 18 carbon atoms and having the carboxy 1 radicals at least a 1,4 position relative to each other, an aliphatic monocyano nitrile having from 6 to about 22 carbon atoms, aliphatic polycyano nitriles having from 12 to about 18 carbon atoms and having the cyano radicals in at least a 1,4 position relative to each other, an aliphatic polycarboxylic acid ester containing from about 6 to about 22 carbon atoms in the acid portion of the molecule and from 1 to about 18 carbon atoms in the alcohol portion of the molecule and the carboxylic acid radicals and the acid portion of the molecule having at least a 1,4 position relative to each other, an ester of an aliphatic cyanocarboxylic acid having from about 6 to about 22 carbon atoms in the carboxy substituted portion of the molecule and from 1 to 18 carbon atoms in the alcohol portion of the molecule and having at least a 1,4 position separation of substituent cyano and carboxyl radicals, and an aliphatic cyanocarboxylic acid having from about 12 to about 18 carbon atoms and having the cyano and carboxyl radicals in at least a 1,4 position relative to each other at temperatures of about 145–205° C.

5. A nitration process comprising contacting, with a tetravalent nitrogen oxide, a saturated material selected from the group consisting of an aliphatic monocarboxylic acid having from 12 to about 18 carbon atoms, an aliphatic monocyano nitrile having from 12 to about 18 carbon atoms, an aliphatic monocarboxylic acid ester containing from 12 to about 18 carbon atoms in the acid portion of the molecule and from about 1 to about 18 carbon atoms in the alcohol portion of the molecule, an aliphatic polycarboxylic acid having from about 12 to about 18 carbon atoms and having the carboxy 1 radicals in at least an aliphatic 1,4 position relative to each other, a monocyano nitrile having from 6 to about 22 carbon atoms, aliphatic polycyano nitriles having from 12 to about 18 carbon atoms and having the cyano radicals in at least a 1,4 position relative to each other, an aliphatic polycarboxylic acid ester containing from about 12 to about 18 carbon atoms in the acid portion of the molecule and from 1 to about 18 carbon atoms in the alcohol portion of the molecule and the carboxylic acid radicals and the acid portion of the molecule having at least a 1,4 position relative to each other, an ester of an aliphatic cyanocarboxylic acid having from about 6 to about 22 carbon atoms in the carboxy substituted portion of the molecule and from 1 to 18 carbon atoms in the alcohol portion of the molecule and having at least a 1,4 position separation of substituent cyano and carboxyl radicals, and an aliphatic cyanocarboxylic acid having from about 12 to about 18 carbon atoms and having the cyano and carboxyl radicals in at least a 1,4 position relative to each other at temperatures of about 150 to 190° C.

6. A process for the preparation of aliphatic nitro monocarboxylic acids comprising contacting an aliphatic monocarboxylic acid having from about 6 to about 22 carbon atoms with the oxide of tetravalent nitrogen at temperatures of about 150–190° C.

7. A process for the preparation of aliphatic nitro monocyano nitriles comprising contacting an aliphatic monocyano nitrile having from 6 to 22 carbon atoms with the oxide of tetravalent nitrogen at temperatures of about 150–190° C.

8. A process for the preparation of aliphatic nitrodicarboxylic acids comprising contacting an aliphatic dicarboxylic acid containing from 6 to about 22 carbon atoms and having the carboxyl radicals in at least a 1,4 position relative to each other with the oxide of tetravalent nitrogen at 150–190° C.

9. A process for the preparation of aliphatic nitrodicyano nitriles comprising contacting an aliphatic dicyano nitrile containing from 6 to about 22 carbon atoms and having the cyano radicals in at least a 1,4 position relative to each other with the oxide of tetravalent nitrogen at 150–190° C.

10. A process for the preparation of aliphatic nitrocyanocarboxylic acids comprising contacting an aliphatic cyanocarboxylic acid containing from about 6 to about 22 carbon atoms and having at least a 1,4 position separation of substituent cyano and carboxyl radicals with the oxide of tetravalent nitrogen at 150–190° C.

11. The process of claim 10 wherein the cyanocarboxylic acid is esterified and the product is a nitrocyanocarboxylic acid ester.

12. A process for the preparation of aliphatic nitroglycerides comprising contacting an aliphatic glyceride with an oxide of tetravalent nitrogen at 150–190° C.

13. A method of producing nitrolauric acid of the formula

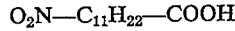
$$O_2N\text{—}C_{11}H_{22}\text{—}COOH$$

which comprises contacting lauric acid with a tetravalent nitrogen oxide at a temperature in the range of 150° to 190° C.

14. A method of producing nitrolauronitrile of the formula

$$O_2N\text{—}C_{11}H_{22}\text{—}CN$$

which comprises contacting a lauronitrile with a tretravalent nitrogen oxide at a temperature in the range of 150° to 190° C.

15. A method of producing a nitrolauric acid ester of the formula

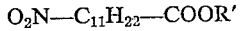
$$O_2N\text{—}C_{11}H_{22}\text{—}COOR'$$

wherein R' is a lower hydrocarbon radical, which comprises contacting a lauric acid ester of the formula

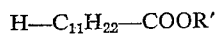
$$H\text{—}C_{11}H_{22}\text{—}COOR'$$

wherein R' has the meaning defined above, with a tetravalent nitrogen oxide at a temperature in the range of 150° to 190° C.

16. The method of claim 15 wherein the lauric acid ester is methyl laurate.

17. A method of producing trinitrostearin of the formula

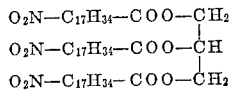
$$\begin{aligned}O_2N\text{—}C_{17}H_{34}\text{—}COO\text{—}CH_2&\\O_2N\text{—}C_{17}H_{34}\text{—}COO\text{—}CH&\\O_2N\text{—}C_{17}H_{34}\text{—}COO\text{—}CH_2&\end{aligned}$$

which comprises contacting in the liquid phase tristearin with a tetravalent nitrogen oxide at a temperature in the range of 150° to 190° C.

No references cited.